United States Patent
Manivel et al.

(10) Patent No.: US 8,793,344 B2
(45) Date of Patent: Jul. 29, 2014

(54) SYSTEM AND METHOD FOR GENERATING A RESPONSE PLAN FOR A HYPOTHETICAL EVENT

(75) Inventors: Vinay Manivel, San Jose, CA (US); Andrey Gusev, Dublin, CA (US); Jonathan Creighton, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 219 days.

(21) Appl. No.: 13/399,951

(22) Filed: Feb. 17, 2012

(65) Prior Publication Data

US 2013/0219022 A1 Aug. 22, 2013

(51) Int. Cl.
*G06F 15/16* (2006.01)

(52) U.S. Cl.
USPC .......................................................... 709/219

(58) Field of Classification Search
USPC .................. 709/202–203, 217–219; 719/318
See application file for complete search history.

(56) References Cited

U.S. PATENT DOCUMENTS

| | | | |
|---|---|---|---|
| 6,292,828 B1* | 9/2001 | Williams ...................... | 709/218 |
| 7,254,579 B2* | 8/2007 | Cabrera et al. ............... | 709/203 |
| 2008/0154677 A1* | 6/2008 | Casey ............................. | 705/7 |
| 2013/0218312 A1* | 8/2013 | Connelly, Jr. .................. | 700/93 |

* cited by examiner

*Primary Examiner* — Bharat N Barot
(74) *Attorney, Agent, or Firm* — Shun Yao; Park, Vaughan, Fleming & Dowler LLP

(57) ABSTRACT

A cluster management system can facilitate determining a response to a hypothetical event by a computer cluster. During operation, the system can receive a request for a policy outcome from a user, such that the request can indicate a hypothetical event within a computer cluster. Next, the system determines a cluster state that includes state information from a plurality of server nodes in the cluster. The system then generates a response plan to the hypothetical event based on the cluster state, without executing the response plan in the cluster. The response plan indicates actions that are to be performed by server nodes in the cluster in response to the hypothetical event. The system then provides the response plan to the user.

18 Claims, 5 Drawing Sheets

SYSTEM AND METHOD FOR GENERATING A RESPONSE PLAN FOR A HYPOTHETICAL EVENT

BACKGROUND

1. Field of the Invention

The present disclosure relates to server clusters. More specifically, the present disclosure relates to a method and system for determining a response plan to a hypothetical event in a computer cluster without modifying the cluster's configuration and state.

2. Related Art

A computer cluster consists of a multitude of computer nodes that work together, for instance, to host applications such as a Web service. A system administrator can deploy an application in the cluster by creating a policy that models the functional requirements of the application, and that indicates the server nodes needed by the application.

Oftentimes, the system administrator expresses the application's requirements in terms of explicit resource entities that represent the application's components, as well as the relationships and dependencies among components. For example, the policy can express a resource as a reference to a physical (a computer node, a disk, a volume, etc.) or logical (an IP address, a database instance, a database service, a server pool, etc.) entity comprising the application. Further, the policy can also indicate resource dependencies that indicate how the application's components interact with each other and with other resources in the cluster.

Once the system administrator creates a policy that models the entities used by the application, the cluster system uses this information to manage the entire application across the cluster, to provide a high availability of the application, and to facilitate scaling the application. Unfortunately, it is not always clear to the system administrator how the cluster system may use the policy to deploy the application in the cluster. It can be difficult for the system administrator to determine how the cluster may interpret the policy to react to an unforeseen event. Further, if the system administrator plans to modify an entity of the cluster (e.g., a server node or an application configuration), it can be difficult for the system administrator to determine how the planned modifications to this entity will affect the cluster as a whole.

SUMMARY

One embodiment of the present invention provides a cluster management system that facilitates determining a response plan to a hypothetical event in a computer cluster without modifying the cluster's configuration. During operation, the system can receive a request for a policy outcome from a user, such that the request can indicate a hypothetical event within a cluster. Next, the system determines a cluster state that includes state information from a plurality of server nodes in the cluster. The system then generates a response plan to the hypothetical event based on the cluster state, without executing the response plan in the cluster. In some embodiments, the response plan can indicate actions that are to be performed by server nodes in the cluster in response to the hypothetical event. The system then provides the response plan to the user.

In some embodiments, the request can indicate a set of critical entities in the cluster that are marked as being critical to a service. Further, the response plan can indicate a set of critical entities whose state would change in response to executing the response plan.

In some embodiments, while generating the response plan, the system can generate a hypothetical state by modifying the cluster state to account for the hypothetical event. The system can also determine an initial cluster configuration that results from the hypothetical event, such that the initial cluster configuration indicates a plurality of resources deployed in server nodes of the cluster, and includes a plurality of resource dependencies among resources. Further, the system can determine policies for one or more applications deployed in the cluster. The system can then use the hypothetical state and the initial cluster configuration to determine a target configuration for the cluster that satisfies the application policies. Then, the system can determine an ordered sequence of actions performed on the server nodes in the cluster to realize the policies in response to the hypothetical event, such that the sequence of actions map the cluster's initial configuration at the hypothetical state to the target configuration that satisfies the application policies.

In some embodiments, the actions in the response plan include the ordered sequence of actions. Further, the actions in the response plan are identical to actions that would be performed on the server nodes in response to an actual event that matches the hypothetical event.

In some embodiments, the response plan also indicates the target configuration of the cluster that would result from executing the response plan.

In some embodiments, the hypothetical event includes at least one of: an addition of a server node to the cluster; a removal of a server node from the cluster; a failure of a server node in the cluster; an addition of a server pool to the cluster; a removal of a server pool from the cluster; an addition of a server node to a server pool; a removal of a server node from a server pool; a modification of an active policy; a modification of a server category; an addition of a resource to a server node; a modification of a resource at a server node; a start of a resource at a server node; a stop of a resource at a server node; a failure of a resource at a server node; and a relocation of a resource within the cluster.

DETAILED DESCRIPTION

Figure 1:
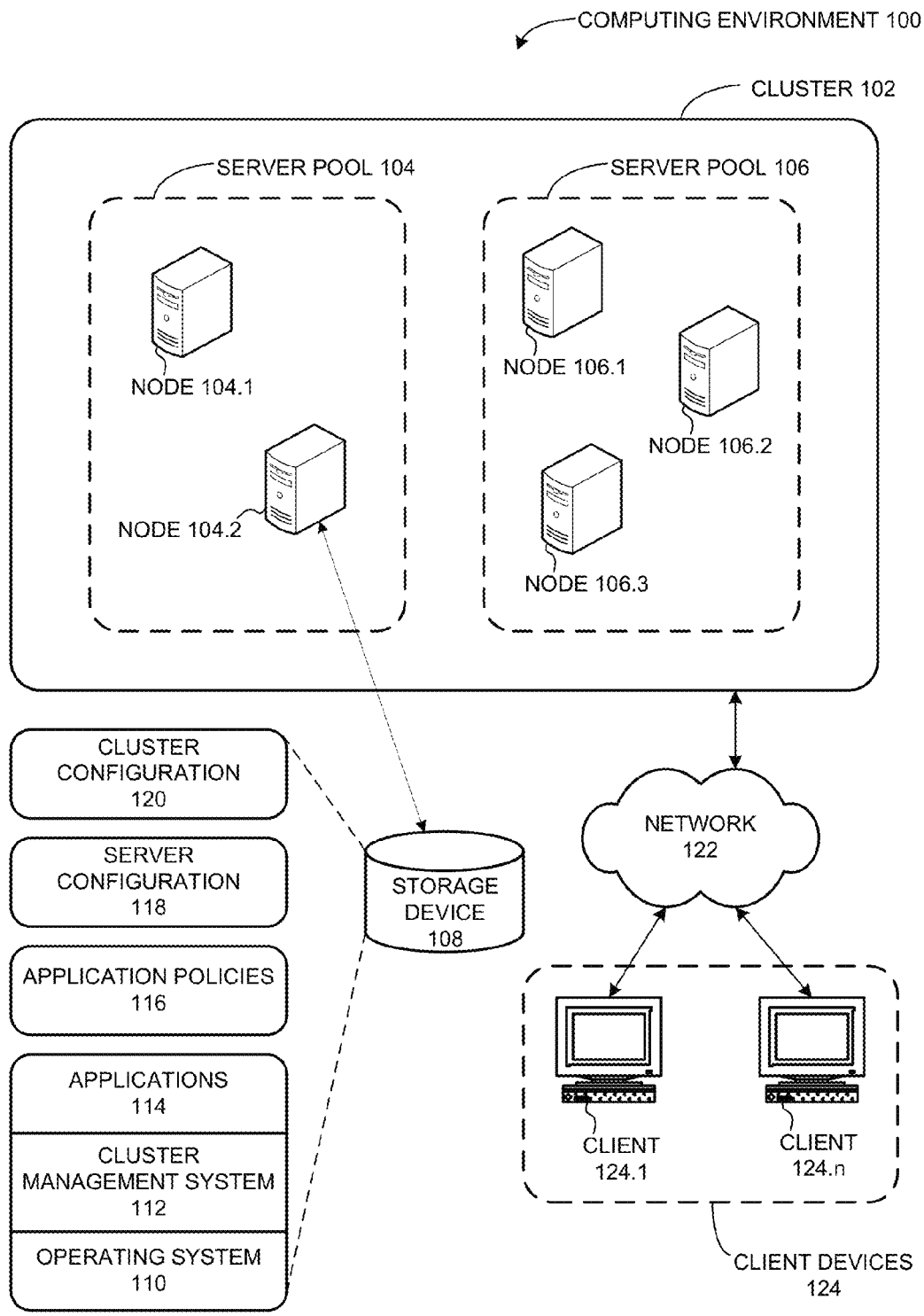
FIG. 1 illustrates an exemplary computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention solve the problem of providing a cluster management system that determines a response plan to a hypothetical event in a cluster without executing the response plan in the cluster. For example, a cluster can include a plurality of server nodes that are configured to provide a plurality of applications (e.g., services), and each application can have a corresponding policy that indicates conditions for deploying the application in the cluster. Thus, when an event occurs within the cluster that affects the application (e.g., when a server fails or is taken offline), the cluster management system can update the cluster's configuration to ensure the application continues to run in accordance with its policy (e.g., by transferring an application resource to another server node).

In some situations, however, a system administrator may need to understand how the cluster management system will modify the cluster's configuration in response to a hypothetical event, without actually changing the cluster's configuration. For example, the system administrator may wish to test the rigidity of an application's policy against unforeseen events, such as when a server node fails or when an application resource fails, or the system administrator may wish to determine how the cluster management system will respond to a change in the application's policy.

As another example, the system administrator may be planning to modify the cluster's configuration (e.g., by taking a server node offline to upgrade its hardware and/or software), and may need to understand how these changes can affect the deployed applications. If the planned modification affects any application in an undesirable way, the system administrator may be able to update the affected application's policy before modifying the cluster's configuration. Alternatively, if the cluster is hosting applications that are managed by various administrators, the system administrator can inform the other administrators of the planned changes, and how these changes will affect their applications.

In some embodiments, the hypothetical event indicated by the request can include an event that modifies a cluster's state or configuration, such as when there is a failure of a server node in the cluster, when a server node is being added to or removed from the cluster, or when a server pool is being added to or removed from the cluster. Other examples include events such as when a server category is modified, or when a server node is added to or removed from a server pool.

In some other embodiments, the hypothetical event can include an event that modifies an application's state or configuration, such as when an application's active policy is modified, or when a resource is added to or removed from a server node. Other examples include events such as when a resource is modified at a server node, when a resource is started or stopped at a server node, when a resource is relocated from one server node to a different server node within the cluster, or when there is a failure of a resource at a server node.

Exemplary Computing Environment

FIG. 1 illustrates an exemplary computing environment 100 in accordance with an embodiment of the present invention. Computing environment 100 can include a computer cluster 102, a plurality of server nodes in cluster 102, a network 122, and a plurality of client devices 124.

Cluster 102 can include a plurality of server nodes that can be organized into server pools based on their assigned categories. A category can include a logical identifier that corresponds to a plurality of server attributes, such that the category can be assigned to a server node whose attributes satisfy those of the category. For example, server pool 104 can include at least nodes 104.1 and 104.2, and server pool 106 can include at least nodes 106.1, 106.2, and 106.3. In some embodiments, a server pool (e.g., server pool 104) can include server nodes whose categories match those of an application's policy. Further, a server node that has not been added to a server pool can belong to a free pool.

In some embodiments, a server node (e.g., node 104.2) can be coupled to network 122 (e.g., a local area network (LAN), a wide area network (WAN), or the Internet) and to a storage device 108. Storage device 108 can include an operating system 110, a cluster management system 112, and a plurality of applications 114. Operating system 110 can include an operating system (e.g., a UNIX or Linux operating system) that hosts cluster management system 112. Also, cluster management system 112 can include a distributed application that executes across the plurality of server nodes in cluster 102, and manages the availability and scalability of various applications across cluster 102.

When a new server node is deployed in a cluster or when an existing server node's attributes change, cluster management system 112 can dynamically assign a category to the server node to describe the updated attributes of the server node. Further, cluster management system 112 can use the categories assigned to different server nodes to dynamically manage the server nodes that belong to a server pool, and to manage which applications are deployed on a given server node or server pool.

The term attribute refers to a characteristic of a server node, which may be an auto-discovered attribute or a user-assigned attribute. For example, an auto-discovered attribute can include a CPU count, a memory size (e.g., for volatile or non-volatile memory), an operating system type or version, a geographic location, or any characteristic of the server node that can be auto-discovered by the server node. Also, a user-assigned attribute can include a numerical value that indicates a user-defined preference for a server node or for a server pool. A server node, for example, can have a user-assigned attribute that indicates a priority level used to determine which server nodes in a pool can be selected first to transfer to a different server pool. Also, a server pool can have a user-assigned attribute that indicates a minimum number of server nodes for the server pool, a priority level for the server pool, or any other numerical value. In some embodiments, a user can request from cluster management system 112 a response plan for a change in a server attribute. Cluster management system 112 can create a response plan that indicates a sequence of actions that would be performed on the cluster in response to the change in server attributes.

A category can have an attribute-requirements expression, which can be a Boolean expression that combines a plurality of attributes using Boolean logic to indicate conditions for determining whether a server node belongs to the category. Thus, when cluster management system 112 detects a change in a node's attributes (e.g., when a server node or a component of the server node fails to operate, or when the server node's components are upgraded or downgraded), cluster management system 112 can dynamically assign to the server node one or more categories that match the node's updated attributes. Further, because a server pool can be associated with one or more categories, cluster management system 112 can dynamically manage the server nodes that belong to the server pool by selecting server nodes that have a category in common with the server pool. In some embodiments, a user can request from cluster management system 112 a response plan for a change in a server node's category assignment. Cluster management system 112 can create a response plan that indicates a sequence of actions that would be performed on the cluster in response to the server node's updated category assignment.

Storage device 108 can also include application policies 116. An application's policy can indicate one or more server categories for the application, and can indicate additional requirements for a server pool (e.g., a minimum number of server nodes, a priority level, etc.). Further, storage device 108 can also include a server configuration 118, which can indicate a plurality of attributes of the server node, one or more categories assigned to the server node, a pool to which the server node belongs, a set of applications that are deployed on the server node, etc. Storage device 108 can also include cluster configuration 120, which can indicate configuration information for one or more server pools, and can indicate server configuration information for other server nodes in the cluster. Cluster management system 112 can use cluster configuration 120 to store a plurality of attributes for a server pool, such as a category attribute that assigns a category to the server pool. Further, when deploying an application on a server pool, cluster management system 112 can assign the application's categories to the server pool as attributes.

Cluster management system 112 performs a complex analysis of many application policies to determine which resources need to be assigned to an application. A change in one application's policy, for example, can cause a server node to be transferred between the application's server pool and another server pool. Also, any change to a server node's hardware or software configuration can cause this server node to be assigned different categories, which in turn can cause cluster management system 112 to transfer this server node from one server pool to another.

For example, cluster management system 112 may create server pool 104 to host two applications, A and B. Thus, cluster management system 112 may determine a set of categories indicated by the policies of applications A and B, and can assign these categories to server pool 104. Then, cluster management system 112 can use these categories assigned to server pool 104 to dynamically adjust the server nodes that belong to server pool 104 (e.g., based on the categories that are dynamically assigned to server nodes in response to a change in a server node's attributes). Therefore, because server nodes are assigned to pools based on dynamically assigned categories, cluster management system 112 can shuffle server nodes with varying characteristics across clusters without requiring the system administrator to change an application's configuration to take advantage of new or upgraded server nodes. Server pools that host the application can dynamically add server nodes whose categories match those of the server pool, and can reject those server nodes that do not have a matching category.

These dynamic changes to a cluster can make it difficult for a system administrator to determine how cluster management system 112 may use a policy to modify the configuration or state of cluster 102 in response to a certain event that takes place in cluster 102. In some embodiments, a user can provide a hypothetical event to cluster management system 112, and can request a response plan that indicates a sequence of actions that would be performed on the cluster in response to the hypothetical event. The hypothetical event, for example, can indicate a change to a cluster state, such as a change in an operating state for a server node, a server pool, or an application in the cluster. As another example, the hypothetical event can indicate a change to a cluster configuration, such as a change in a configuration for a server node (e.g., the server node's attributes or category), a server pool, or an application in the cluster. Cluster management system 112 can respond by generating a response plan to the hypothetical event, without executing the response plan in the cluster.

Generating a Response Plan

Figure 2:
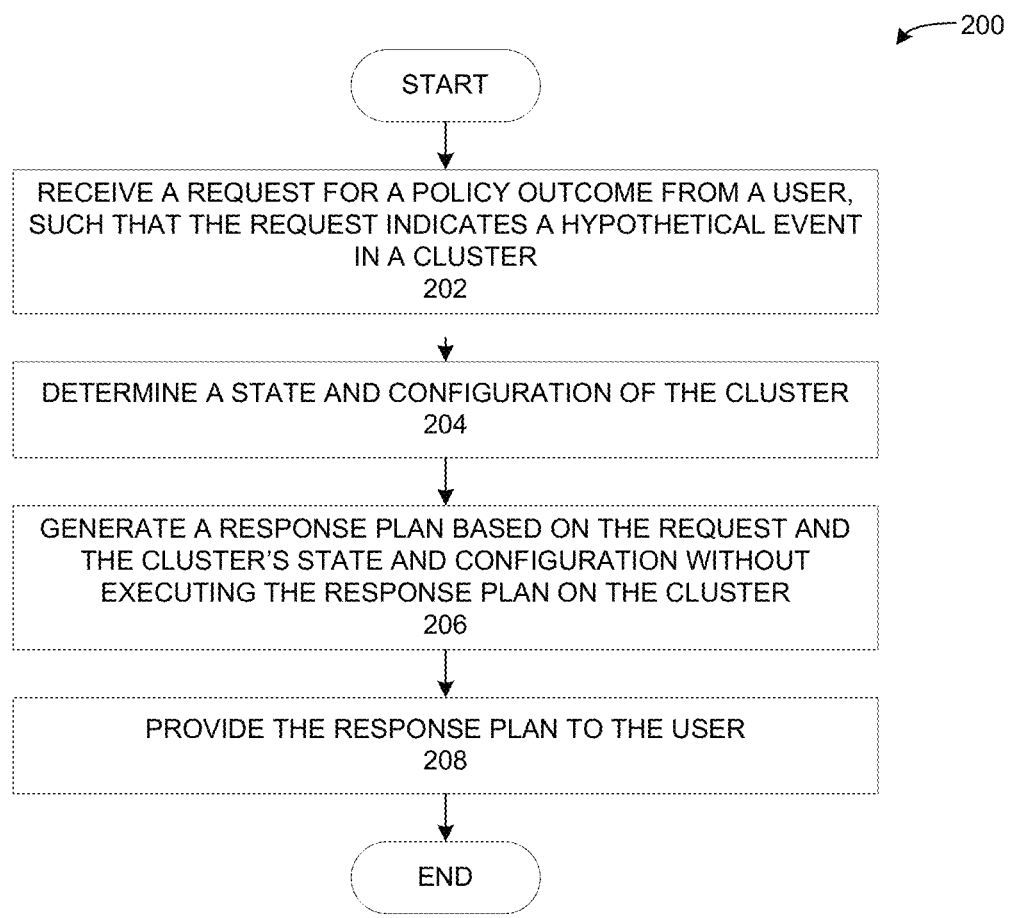
FIG. 2 presents a flow chart illustrating a method for determining a response plan to a hypothetical event in a cluster in accordance with an embodiment of the present invention.

FIG. 2 presents a flow chart illustrating a method 200 for determining a response plan to a hypothetical event in a cluster in accordance with an embodiment of the present invention. During operation, the system can receive a request from a user for a policy outcome, such that the request can indicate a hypothetical event in a cluster (operation 202). For example, the hypothetical event can include an event that modifies the configuration or state of server nodes in the cluster, or that modifies the configuration or state of an application deployed in the cluster.

Next, the system can determine a state and configuration of the cluster (operation 204). The cluster's configuration can include a plurality of server pools in the cluster, membership information for each server pool (e.g., one or more server nodes that belong to a server pool), server attributes for each server node, categories assigned to each server node, and the resources deployed in each server node and/or server pool. Further, the cluster's state can include the operating state for each server node of the cluster, and can include the operating state for the resources deployed in each server node and/or server pool.

In some embodiments, the operating state of a server node can indicate whether the server node is operating correctly, and can indicate an operating state for each of the server node's attributes. The operating state for a server node's attributes can include, for example, an amount of total and/or available memory (RAM), an amount of total and/or available local non-volatile storage space, a number of available processors, etc.

Then, the system generates a response plan based on the request, and based on the cluster's state and configuration, without executing the response plan on the cluster (operation 206). For example, the system can determine a final cluster configuration that satisfies one or more application policies (e.g., that satisfies attribute requirements corresponding to server categories listed in each policy). Also, the system can determine an ordered sequence of actions that would be performed by server nodes in the cluster to implement the one or more policies.

The system then provides the response plan to the user (operation 208). In some embodiments, the response plan can indicate the ordered sequence of actions that would be performed by server nodes in the cluster to implement the policies given the hypothetical event. The response plan can also indicate the final state and configuration of the cluster that would result from executing the response plan.

Further, in some embodiments, the request can indicate a set of critical entities (e.g., server nodes and/or application resources) that are marked as being critical to a service. Then, the system determines whether the response plan changes the state and/or configuration of any critical entities. If so, the system can generate the response plan so that it indicates the critical entities whose state and/or configuration would change in response to the hypothetical event. For example, the response plan can include a list of the critical entities whose state and/or configuration would change. As another example, if an action of the response plan modifies the state and/or configuration, the response plan can indicate that the action modifies the critical entity (e.g., by presenting an appropriate label next to the action, such as an asterisk or any other character sequence), and the system can indicate which critical entities are modified by the listed action.

Figure 3:
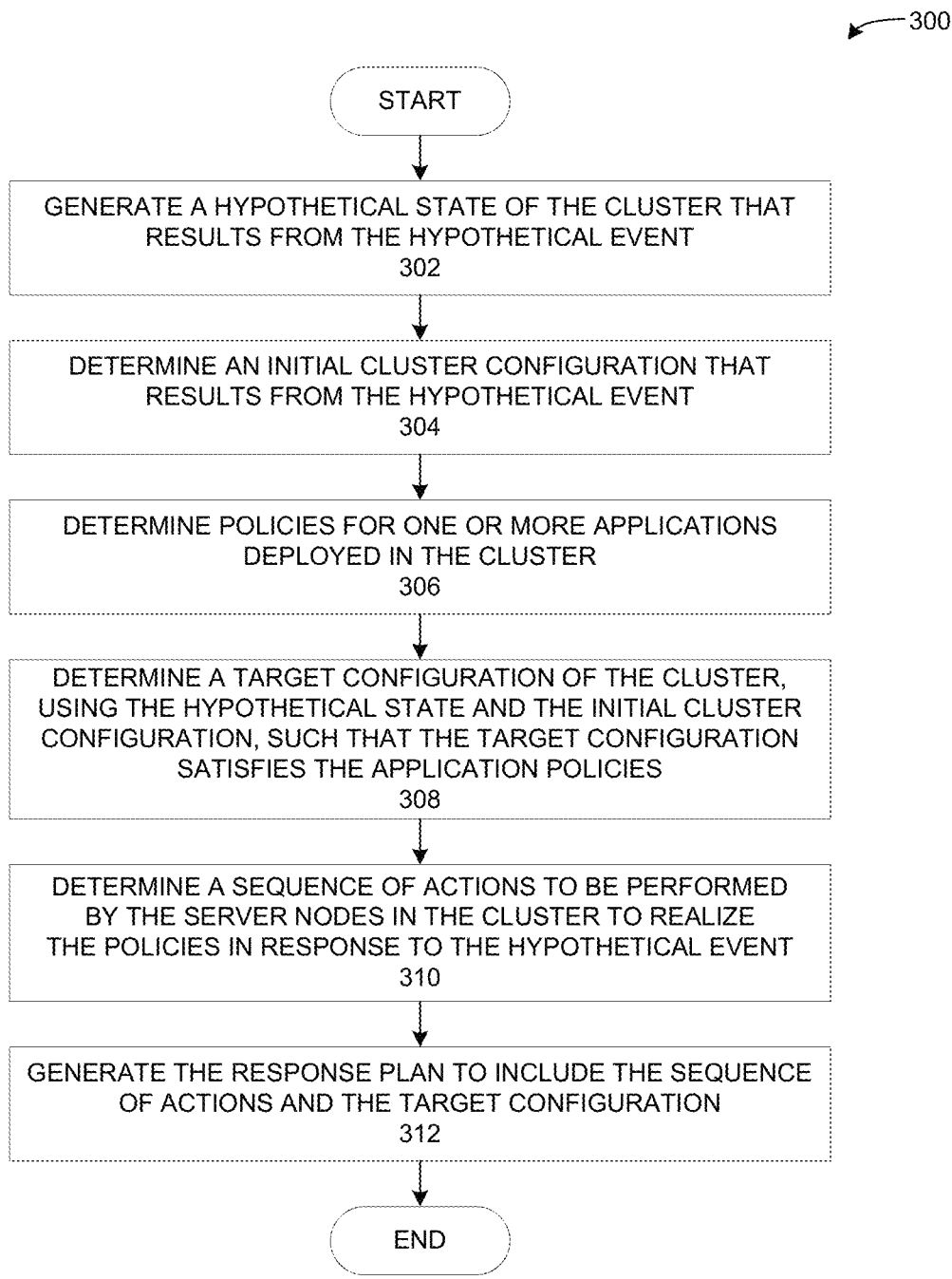
FIG. 3 presents a flow chart illustrating a method for generating a response plan in accordance with an embodiment of the present invention.

FIG. 3 presents a flow chart illustrating a method 300 for generating a response plan in accordance with an embodiment of the present invention. During operation, the system can generate a hypothetical state by modifying the cluster state to account for the hypothetical event (operation 302). For example, if the hypothetical event directly affects the cluster state (e.g., the hypothetical event includes a change in the operating state for a server node or a server resource), the system can modify the cluster state to reflect the change caused by the hypothetical event. The hypothetical state can indicate an operating state for one or more server nodes deployed in the cluster, and can include an operating state for one or more resources deployed in each server node.

The system can also determine an initial cluster configuration that results from the hypothetical event (operation 304). For example, if the hypothetical event directly affects the cluster's configuration (e.g., the hypothetical event includes a modification to an active policy, a server node's configuration, and/or a server pool's configuration), the system can modify the cluster's configuration to reflect the change caused by the hypothetical event. The initial cluster configuration can indicate a configuration for a plurality of server nodes and/or a plurality of server pools in the cluster. Further, the initial cluster configuration can also indicate the resources configured to run in each server node, and can include a plurality of resource dependencies among resources.

Next, the system can determine policies for one or more applications deployed in the cluster (operation 306). The system can then use the hypothetical state and the initial cluster configuration to determine a target configuration for the cluster that satisfies the application policies (operation 308).

Then, the system can determine a sequence of actions that would be performed on the server nodes in the cluster to realize the policies in response to the hypothetical event (operation 310). The sequence of actions map the cluster's initial configuration at the hypothetical state to the target configuration that satisfies the application policies. The system then generates the response plan to include the sequence of actions and the target configuration for the cluster (operation 312). The response plan can include an ordered sequence of actions that would be performed on the server nodes. An action in the sequence can include a change to the cluster's configuration or state.

In some embodiments, the system can generate the response plan using a centralized system, or using an ad-hoc and distributed system that includes a plurality of server nodes in the cluster. For example, to implement the centralized system, a single server node in the cluster (e.g., server node 104.2 of FIG. 1) can maintain a repository that stores the cluster's updated state and updated configuration. Then, when the system receives the request for the policy outcome, the system can use the cluster's state and configuration stored in the repository to generate the response plan.

Further, to implement the distributed system, a plurality of server nodes in the cluster can be selected to generate different portions of the response plan. For example, in some embodiments, each server node in the cluster can generate a response plan to update the configuration for that server node. A server node can maintain a repository that stores the updated state and updated configuration for various server nodes and server pools in the cluster. Thus, the server node can use this repository to generate a response plan to optimize the server node's configuration based on the application policies (e.g., by transferring the server node to a different server pool or by modifying the configuration of a resource in the server node). Then, during operation 312, the system can compile a plurality of response plans from multiple server nodes across the cluster to generate the final response plan.

In some other embodiments, a server node in each server pool is selected to generate a response plan to update the configuration of the server pool and for the server nodes in the server pool. This server node can maintain a repository that stores the updated state and updated configuration for various server nodes and server pools in the cluster. Thus, this server node can use the repository to generate a response plan to optimize the configuration for the server pool based on the application policies (e.g., by selecting the server nodes that belong to the server pool or by updating the configuration for the server nodes in the server pool). Then, during operation 312, the system can compile a plurality of response plans from multiple server nodes across the cluster to generate the final response plan.

Figure 4:
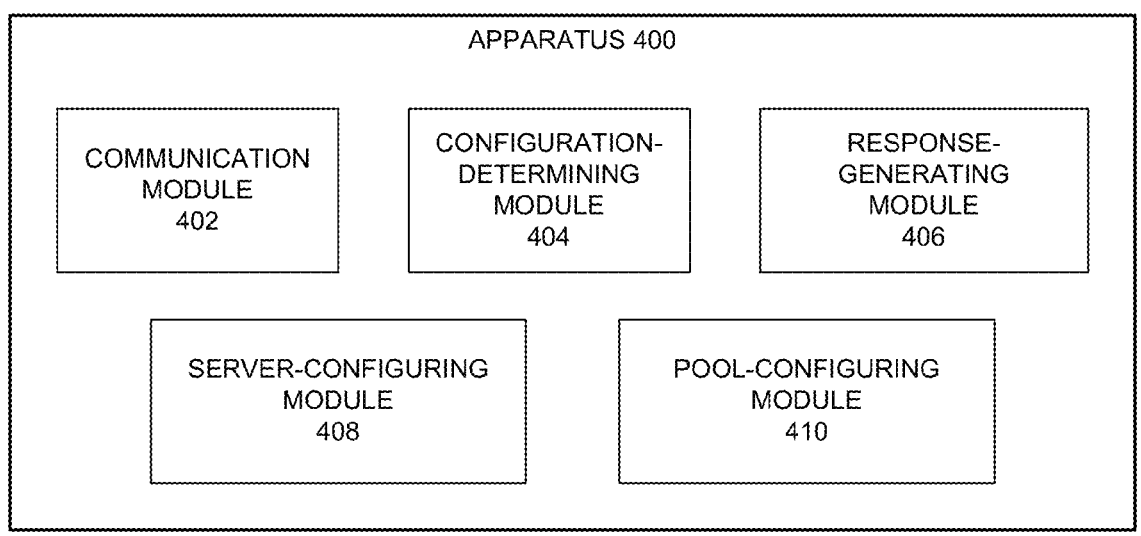
FIG. 4 illustrates an exemplary apparatus that facilitates determining a response plan to a hypothetical event in a cluster in accordance with an embodiment of the present invention.

FIG. 4 illustrates an exemplary apparatus 400 that facilitates determining a response plan to a hypothetical event in a cluster in accordance with an embodiment of the present invention. Apparatus 400 can comprise a plurality of modules which may communicate with one another via a wired or wireless communication channel. Apparatus 400 may be realized using one or more integrated circuits, and may include fewer or more modules than those shown in FIG. 4. Further, apparatus 400 may be integrated in a computer system, or realized as a separate device which is capable of communicating with other computer systems and/or devices. Specifically, apparatus 400 can comprise a communication module 402, a configuration-determining module 404, a response-generating module 406, a server-configuring module 408, and a pool-configuring module 410.

In some embodiments, communication module 402 can receive a request for a policy outcome from a user, such that the request can indicate a hypothetical event within a cluster. Communication module 402 can also provide a generated response plan to the user.

Configuration-determining module 404 can determine a cluster state and cluster configuration for the cluster, and policies for one or more applications deployed in the cluster. Response-generating module 406 can generate a response plan for the hypothetical event based on the cluster's state and configuration, without executing the response plan in the cluster. The response plan can indicate actions that are to be performed by server nodes in the cluster to satisfy the application policies in response to the hypothetical event.

Server-configuring module 408 can determine a configuration for a server node that satisfies one or more application policies. For example, server-configuring module 408 can assign a category to the server node (or remove a category assignment) when the hypothetical event causes a change in the server node's attributes. Pool-configuring module 410 can determine a configuration for a server pool that satisfies one or more application policies. For example, pool-configuring module 410 can select a server node from the cluster to add to the server pool when the hypothetical event causes a change to the attribute requirements for at least one of the server pool's categories, and/or causes a change to a server node's assigned categories.

Figure 5:
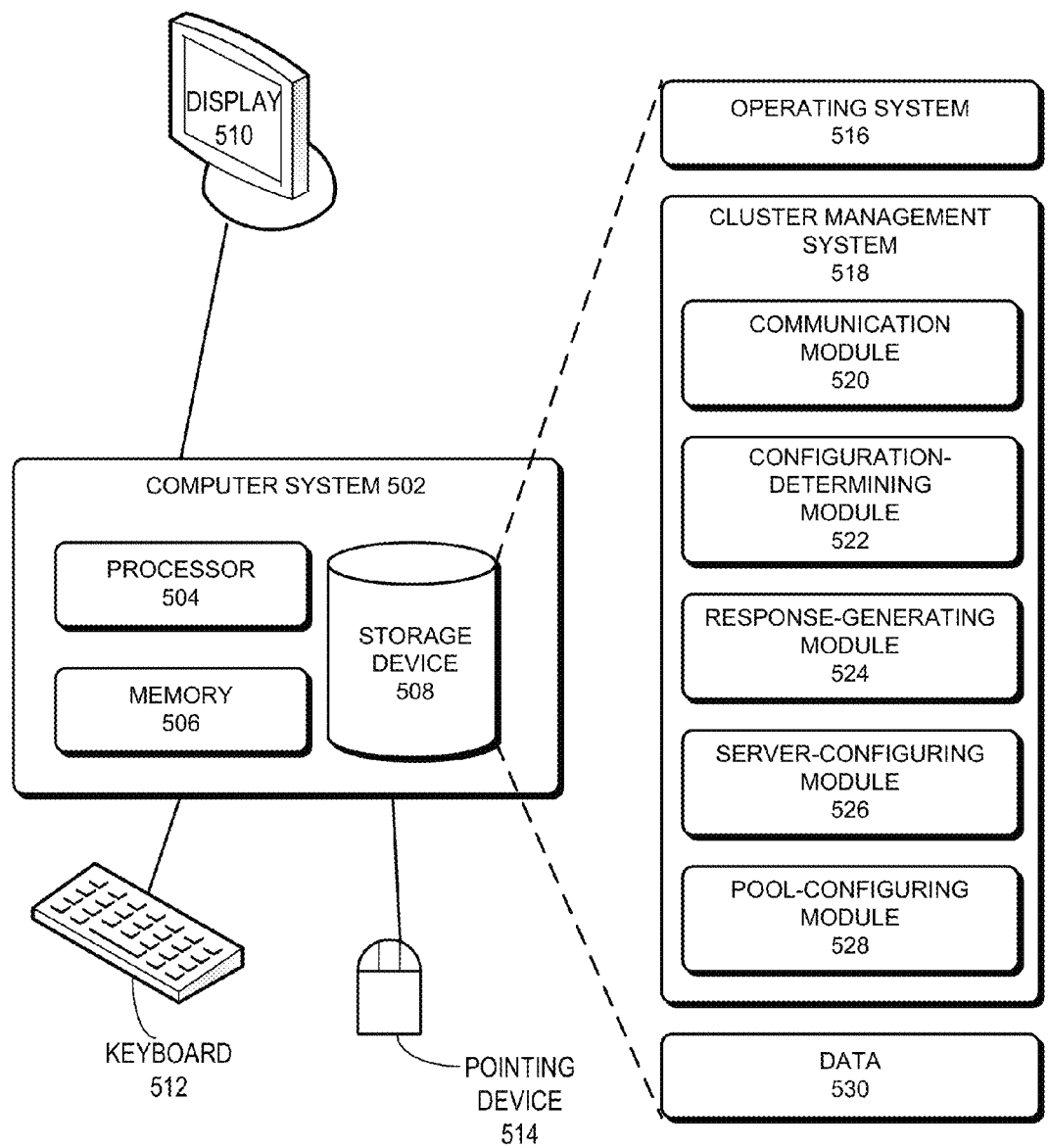
FIG. 5 illustrates an exemplary computer system that facilitates determining a response plan to a hypothetical event in a cluster in accordance with an embodiment of the present invention.

FIG. 5 illustrates an exemplary computer system 502 that facilitates determining a response plan to a hypothetical event in a cluster in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a cluster management system 518, and data 530.

Cluster management system 518 can include instructions, which when executed by computer system 502, can cause computer system 502 to perform methods and/or processes described in this disclosure. Specifically, cluster management system 518 may include instructions for receiving a request for a policy outcome from a user, and for providing a response plan to the user (communication module 520). In some embodiments, the request can indicate a hypothetical event within a cluster. Cluster management system 518 may also include instructions for determining a cluster state and cluster configuration for the cluster, and policies for one or more applications deployed in the cluster (configuration-determining module 522).

Further, cluster management system 518 may also include instructions for generating a response plan for the hypothetical event based on the cluster's state and configuration, without executing the response plan in the cluster (response-generating module 524). The response plan can indicate actions that are to be performed by server nodes in the cluster to satisfy the application policies in response to the hypothetical event.

Cluster management system 518 may include instructions for determining a configuration for a server node that satisfies one or more application policies (server-configuring module 526). For example, server-configuring module 526 can assign a category to the server node (or remove a category assignment) when the hypothetical event causes a change in the server node's attributes. Cluster management system 518 may also include instructions for determining a configuration for a server pool that satisfies one or more application policies (pool-configuring module 528). For example, pool-configuring module 528 can select a server node from the cluster to add to the server pool when the hypothetical event causes a change to the attribute requirements for at least one of the server pool's categories, and/or causes a change to a server node's assigned categories.

Data 530 can include any data that is required as input or that is generated as output by the methods and/or processes described in this disclosure. Specifically, data 530 can store at least state information for one or more server nodes in the cluster (a cluster state), configuration information for one or more server nodes and/or pools in the cluster (a cluster configuration), one or more application policies, category definitions, category assignments to server nodes and/or server pools in the cluster, and a response plan.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    receiving, at a computing device, a request for a policy outcome from a user, wherein the request indicates a hypothetical event within a computer cluster;
    determining a cluster state, which includes state information from a plurality of server nodes in the cluster;
    generating a response plan for the hypothetical event based on the cluster state, without executing the response plan in the cluster, which involves:
    generating a hypothetical state by modifying the cluster state to account for the hypothetical event;
    determining an initial cluster configuration that results from the hypothetical event, indicates a plurality of resources deployed in server nodes of the cluster, and includes a plurality of resource dependencies among the resources;
    determining, based on the hypothetical state and the initial cluster configuration, a target cluster configuration that satisfies application policies for one or more applications deployed in the cluster; and
    determining an ordered sequence of actions performed by the server nodes in the cluster to realize the policies in response to the hypothetical event, wherein the sequence of actions map the cluster's initial configuration at the hypothetical state to the target configuration that satisfies the application policies; and
    providing the response plan to the user.

2. The method of claim 1, wherein the request indicates a set of critical entities in the cluster that are marked as being critical to a service.

3. The method of claim 2, wherein the response plan indicates a set of critical entities whose state would change in response to executing the response plan.

4. The method of claim 1, wherein the actions in the response plan include the ordered sequence of actions, and wherein the actions in the response plan are identical to actions that would be performed by the server nodes in response to an actual event that matches the hypothetical event.

5. The method of claim 1, wherein the response plan also indicates the target configuration of the cluster that would result from executing the response plan.

6. The method of claim 1, wherein the hypothetical event includes at least one of:
    an addition of a server node to the cluster;
    a removal of a server node from the cluster;
    a failure of a server node in the cluster;
    an addition of a server pool to the cluster;

a removal of a server pool from the cluster;
an addition of a server node to a server pool;
a removal of a server node from a server pool;
a modification of an active policy;
a modification of a server category;
an addition of a resource to a server node;
a modification of a resource at a server node;
a start of a resource at a server node;
a stop of a resource at a server node;
a failure of a resource at a server node; and
a relocation of a resource within the cluster.

7. A non-transitory computer-readable storage medium storing instructions that when executed by a computer cause the computer to perform a method, the method comprising:
   receiving a request for a policy outcome from a user, wherein the request indicates a hypothetical event within a computer cluster;
   determining a cluster state, which includes state information from a plurality of server nodes in the cluster;
   generating a response plan for the hypothetical event based on the cluster state, without executing the response plan in the cluster, which involves:
      generating a hypothetical state by modifying the cluster state to account for the hypothetical event;
      determining an initial cluster configuration that results from the hypothetical event, indicates a plurality of resources deployed in server nodes of the cluster, and includes a plurality of resource dependencies among the resources;
      determining, based on the hypothetical state and the initial cluster configuration, a target cluster configuration that satisfies application policies for one or more applications deployed in the cluster; and
      determining an ordered sequence of actions performed by the server nodes in the cluster to realize the policies in response to the hypothetical event, wherein the sequence of actions map the cluster's initial configuration at the hypothetical state to the target configuration that satisfies the application policies; and
   providing the response plan to the user.

8. The storage medium of claim 7, wherein the request indicates a set of critical entities in the cluster that are marked as being critical to a service.

9. The storage medium of claim 8, wherein the response plan indicates a set of critical entities whose state would change in response to executing the response plan.

10. The storage medium of claim 7, wherein the actions in the response plan include the ordered sequence of actions, and wherein the actions in the response plan are identical to actions that would be performed by the server nodes in response to an actual event that matches the hypothetical event.

11. The storage medium of claim 7, wherein the response plan also indicates the target configuration of the cluster that would result from executing the response plan.

12. The storage medium of claim 7, wherein the hypothetical event includes at least one of:
   an addition of a server node to the cluster;
   a removal of a server node from the cluster;
   a failure of a server node in the cluster;
   an addition of a server pool to the cluster;
   a removal of a server pool from the cluster;
   an addition of a server node to a server pool;
   a removal of a server node from a server pool;
   a modification of an active policy;
   a modification of a server category;
   an addition of a resource to a server node;
   a modification of a resource at a server node;
   a start of a resource at a server node;
   a stop of a resource at a server node;
   a failure of a resource at a server node; and
   a relocation of a resource within the cluster.

13. An apparatus comprising:
   a communication module to receive a request for a policy outcome from a user, wherein the request indicates a hypothetical event within a cluster;
   a configuration-determining module to determine a cluster state, wherein the cluster state includes state information from a plurality of server nodes in the cluster; and
   a response-generating module to generate a response plan for the hypothetical event based on the cluster state, without executing the response plan in the cluster, wherein generating the response plan involves:
      generating a hypothetical state by modifying the cluster state to account for the hypothetical event;
      determining an initial cluster configuration that results from the hypothetical event, indicates a plurality of resources deployed in server nodes of the cluster, and includes a plurality of resource dependencies among the resources;
      determining, based on the hypothetical state and the initial cluster configuration, a target cluster configuration that satisfies application policies for one or more applications deployed in the cluster; and
      determining an ordered sequence of actions performed by the server nodes in the cluster to realize the policies in response to the hypothetical event, wherein the sequence of actions map the cluster's initial configuration at the hypothetical state to the target configuration that satisfies the application policies;
   wherein the communication module is further configured to provide the response plan to the user.

14. The apparatus of claim 13, wherein the request indicates a set of critical entities in the cluster that are marked as being critical to a service.

15. The apparatus of claim 14, wherein the response plan indicates a set of critical entities whose state would change in response to executing the response plan.

16. The apparatus of claim 13, wherein the actions in the response plan include the ordered sequence of actions, and wherein the actions in the response plan are identical to actions that would be performed by the server nodes in response to an actual event that matches the hypothetical event.

17. The apparatus of claim 13, wherein the response plan also indicates the target configuration of the cluster that would result from executing the response plan.

18. The apparatus of claim 13, wherein the hypothetical event includes at least one of:
   an addition of a server node to the cluster;
   a removal of a server node from the cluster;
   a failure of a server node in the cluster;
   an addition of a server pool to the cluster;
   a removal of a server pool from the cluster;
   an addition of a server node to a server pool;
   a removal of a server node from a server pool;
   a modification of an active policy;
   a modification of a server category;
   an addition of a resource to a server node;
   a modification of a resource at a server node;
   a start of a resource at a server node;
   a stop of a resource at a server node;
   a failure of a resource at a server node; and
   a relocation of a resource within the cluster.

* * * * *